(12) United States Patent
Chen et al.

(10) Patent No.: US 9,020,151 B1
(45) Date of Patent: Apr. 28, 2015

(54) SECURE REAL-TIME DATA REPLICATION WITH DISK ENCRYPTION AND KEY MANAGEMENT SYSTEM

(71) Applicant: Trend Micro Incorporated, Tokyo (JP)

(72) Inventors: Kuan-Hung Chen, Taipei (TW); Po-Hsun Yen, Taipei (TW); Kun-Hao Liu, Taipei (TW); Wei-wei Lin, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 156 days.

(21) Appl. No.: 13/783,649

(22) Filed: Mar. 4, 2013

(51) Int. Cl.
*H04L 9/00* (2006.01)
*H04L 9/08* (2006.01)
*H04L 9/30* (2006.01)

(52) U.S. Cl.
CPC .... *H04L 9/08* (2013.01); *H04L 9/30* (2013.01)

(58) Field of Classification Search
CPC .................................. H04L 9/08; H04L 9/30
USPC ....................................... 380/277–278; 726/6
See application file for complete search history.

(56) References Cited

U.S. PATENT DOCUMENTS

| | | | |
|---|---|---|---|
| 6,886,096 | B2 | 4/2005 | Appenzeller et al. |
| 7,003,117 | B2 | 2/2006 | Kacker et al. |
| 7,017,181 | B2 | 3/2006 | Spies et al. |
| 7,103,911 | B2 | 9/2006 | Spies et al. |
| 7,113,594 | B2 | 9/2006 | Boneh et al. |
| 7,266,847 | B2 | 9/2007 | Pauker et al. |
| 8,429,721 | B1 * | 4/2013 | Tock et al. ........................ 726/4 |
| 2004/0179684 | A1 | 9/2004 | Appenzeller et al. |
| 2009/0262941 | A1 * | 10/2009 | Weis ............................. 380/277 |
| 2012/0066493 | A1 * | 3/2012 | Widergren et al. ........... 713/160 |

FOREIGN PATENT DOCUMENTS

| | | |
|---|---|---|
| GB | 2 434 947 | 8/2007 |
| GB | 2 436 668 | 10/2007 |
| GB | 2 436 910 | 10/2007 |
| WO | 2007088337 | 8/2007 |
| WO | 2007110598 | 10/2007 |

OTHER PUBLICATIONS

Amazon Web Services Developer Community: S3 Encryption, posted on Jun. 10, 2009 (1 sheet).
Amazon Web Services: Introducing Amazon Virtual Private Cloud, 1 sheet [retrieved on Aug. 27, 2009], retrieved from the internet: http://aws.amazon.com/.
Extern blog SensePost;—Blackhat presentation demo vids: Summary, Aug. 2009, 2 sheets.
Rational Survivability: The Big Four Cloud Computing Providers: Security Compared (Part I), Nov. 26, 2008, 3 sheets.
Cloud Computing, Cloud Hosting & Online Storage by Rackspace Hosting, 4 sheets [retrieved on Aug. 27, 2009], retrieved from the internet: http://www.rackspacecloud.com/.
Saied Hosseini Khayat, "Using Communication Encryption to Share a Secret" Aug. 18, 2008, pp. 1-6, Electrical Engineering Dept., Ferdowsi University of Mashhad, Iran.

* cited by examiner

*Primary Examiner* — Anthony Brown
(74) *Attorney, Agent, or Firm* — Okamoto & Benedicto LLP

(57) ABSTRACT

A secure real-time data replication system includes a key management server that provides keys to hosts that store encrypted data. Data to be written in one host is encrypted using a key received from the key management server; the encrypted data is stored in the host. A copy of the data is provided to another host for real-time data replication. In the other host, the copy of the data is encrypted using another key received from the key management server; the encrypted copy of the data is stored in the other host. Keys are provided by the key management server based on policy rules governing the keys.

16 Claims, 3 Drawing Sheets

US 9,020,151 B1

SECURE REAL-TIME DATA REPLICATION WITH DISK ENCRYPTION AND KEY MANAGEMENT SYSTEM

BACKGROUND OF THE INVENTION

1. Field of the Invention

The present invention relates generally to computer security, and more particularly but not exclusively to real-time data replication.

2. Description of the Background Art

Data replication technologies are employed for back-up, archival, service fail-over, and other high availability applications. As its name implies, real-time data replication involves replication of data as the data is written onto data storage. One problem with existing data replication technologies is the difficulty in securing the replicated data. More specifically, securing replicated data involves some form of encryption that requires use and management of secret keys. When data replication involves storing the replicated data in different host computer systems, key management and host configuration to use the keys become complicated, dissuading some administrators from encrypting replicated data.

SUMMARY

In one embodiment, a secure real-time data replication system includes a key management server that provides keys to hosts that store encrypted data. Data to be written in one host is encrypted using a key received from the key management server; the encrypted data is stored in the host. A copy of the data is provided to another host for real-time data replication. In the other host, the copy of the data is encrypted using another key received from the key management server; the encrypted copy of the data is stored in the other host. Keys are provided by the key management server based on policy rules governing the keys.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
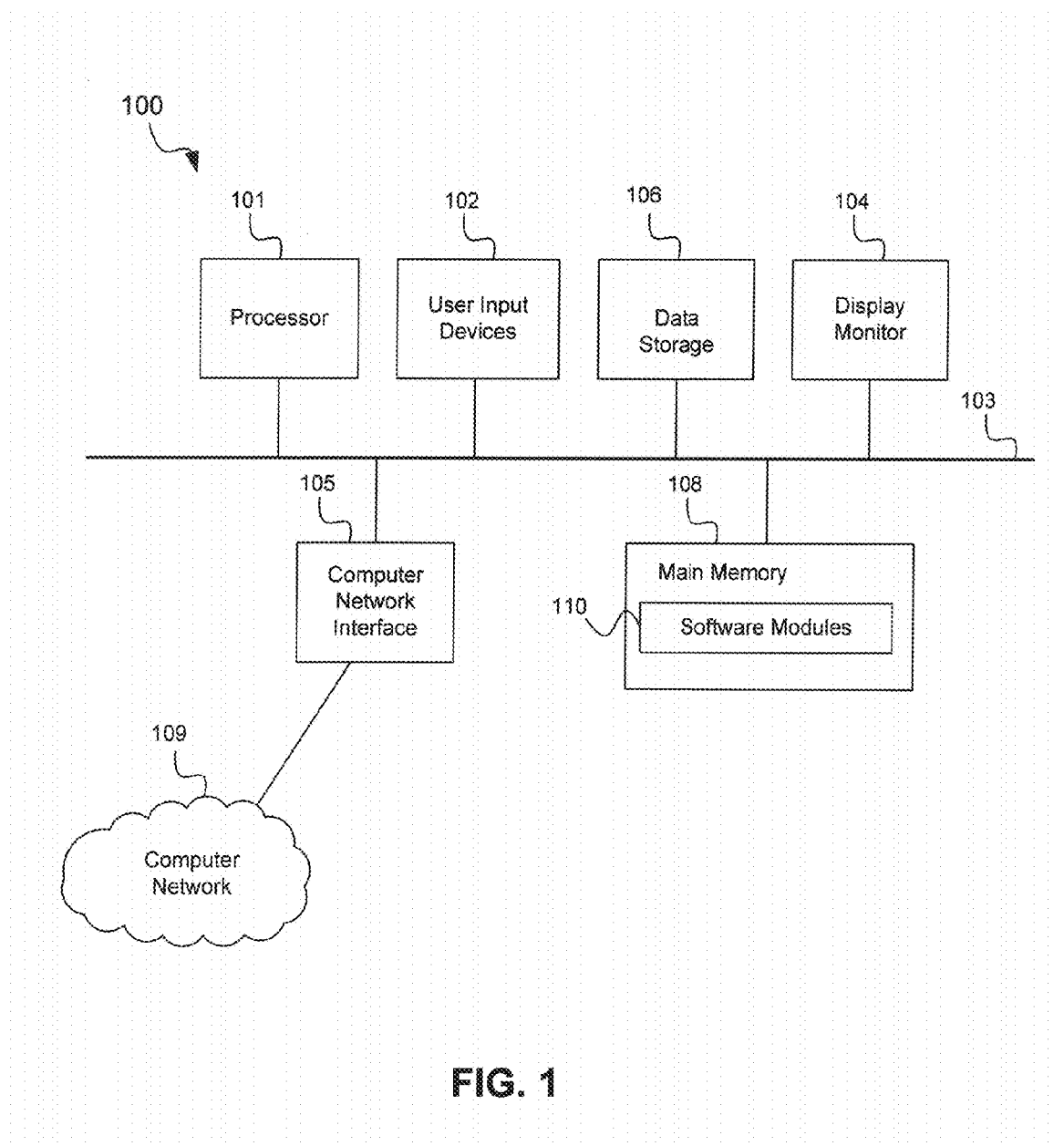
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as a host computer system or a key management server, for example. The computer 100 may have fewer or more components to meet the needs of a particular application. The computer 100 may include a processor 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor, cathode ray tube), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise a key management agent, a data replication module, and an encryption/decryption filter when the computer 100 is employed as a host computer system.

The computer 100 may be configured to perform its functions by executing the software modules 110. The software modules 110 may be loaded from the data storage device 106 to the main memory 108. An article of manufacture may be embodied as computer-readable storage medium including instructions that when executed by a computer causes the computer to be operable to perform the functions of the software modules 110.

Figure 2:
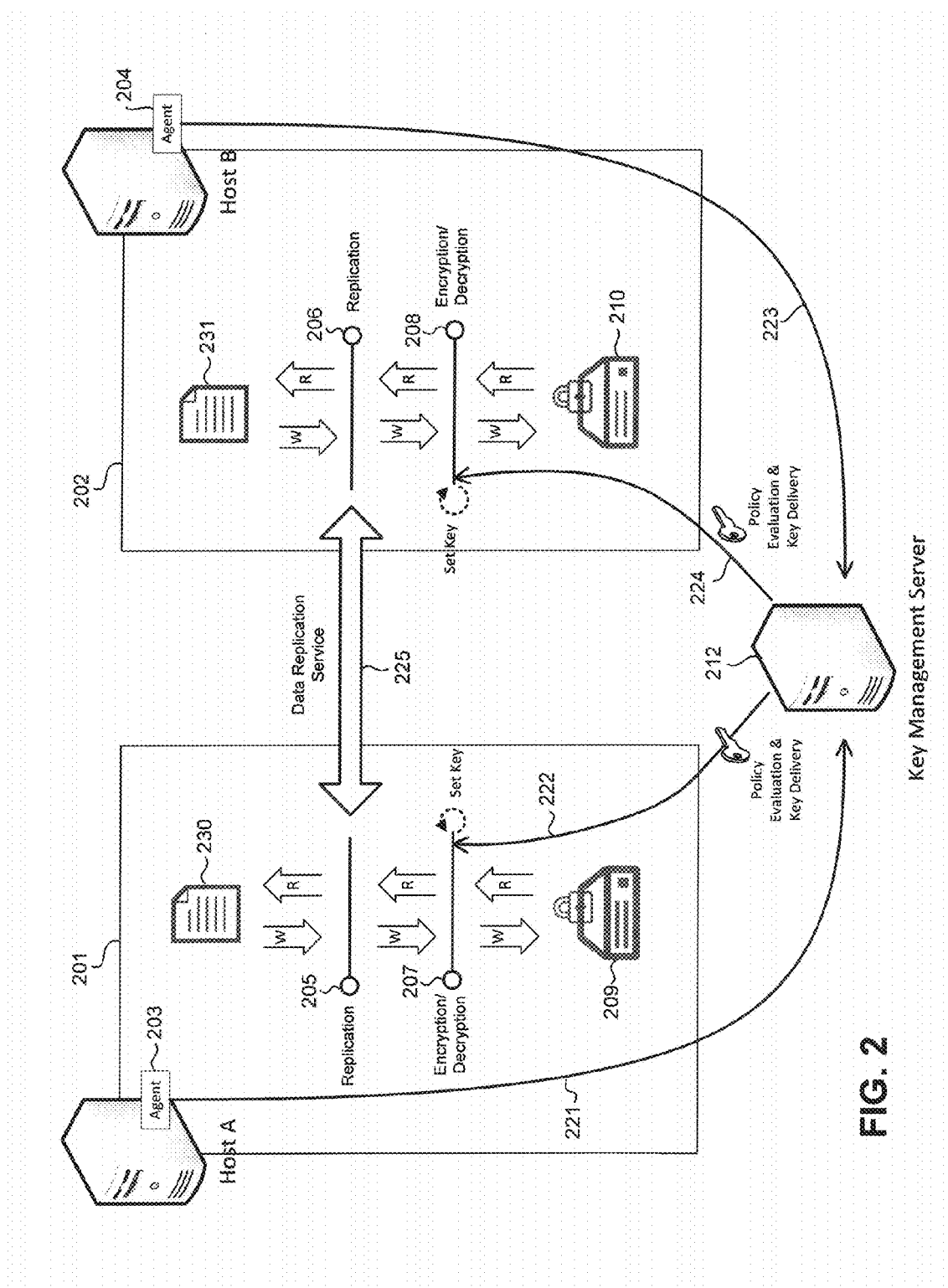
FIG. 2 shows a schematic diagram of a secure real-time data replication system in accordance with an embodiment of the present invention.

FIG. 2 shows a schematic diagram of a secure real-time data replication system in accordance with an embodiment of the present invention. In the example of FIG. 2, the system includes a host computer system 201, a host computer system 202, and a key management server 212. The host computer systems ("hosts") 201 and 202 are separate computer systems and communicate over a computer network, such as the Internet, to perform data replication in real-time. In the example of FIG. 2, the hosts 201 and 202 communicate in accordance with the Transmission Control Protocol/Internet Protocol (TCP/IP).

In the example of FIG. 2, the host 201 (also labeled as "host A"), includes a key management agent 203, a data replication module 205, an encryption/decryption filter 207, and a data storage 209. The host 202 (also labeled as "host B") has the same components namely, a key management agent 204, a data replication module 206, an encryption/decryption filter 208, and a data storage 210. Data (e.g., file 230) in the host 201 may be written onto the data storage 209 (e.g., disk drive, solid state drive, or other data storage device) in the host 201 and replicated in real-time in the host 202 for back-up, archival, and other purposes. Similarly, data (e.g., file 231) in the host 202 may be written onto the data storage 210 in the host 202 and replicated in real-time in the host 201. Each of the hosts 201 and 202 requires different encryption/decryption keys ("keys") to encrypt and decrypt data to and from their respective data storage devices. That is, the key for host 201 cannot be used for encryption/decryption in the host 202, and vice-versa. As will be more apparent below, the key management server 212 facilitates key retrieval and security.

An encryption/decryption filter (207 or 208) provides on-the-fly data encryption/decryption for data to be stored in or read from a data storage device. In one embodiment, each disk access that is going through the encryption/decryption filter will be decrypted in read operation and encrypted in write operation. Examples of suitable programs may be employed as encryption/decryption filters in embodiments of the present invention include dm-crypt, Trend Micro Disk Encryption Engine, FreeOTFE, and TrueCrypt programs. Other suitable on-the-fly disk encryption/decryption solutions may also be employed.

A data replication service 225 is a service for replicating data across host boundaries. In the example of FIG. 2, the data replication service 225 is provided by the replication module 205 in the host 201 and the replication module 206 in the host 202. Data to be written to the data storage 209 in the host 201 is received by the replication module 205, which sends the data to the replication module 206 for replication in the host 202. Data from the host 202 may be replicated in the host 201 in a similar manner. An example data replication service for the LINUX operating system may be realized using the DRBD disk block replicator. Other data replication services that may be employed include the rsync program and database mirroring programs provided by some database vendors. Typical data replication services handle only raw data. That is, data is not encrypted as part of replication.

The key management server 212 comprises a computer system that runs server software to receive a key request and integrity result from a key management agent (203 or 204) and determine whether or not to provide the requested key to the key management agent based on predefined policy rules. The policy rules may be user-defined and enforced based on information from the integrity result, for example. The key management server 212 may provide the requested key to the corresponding encryption/decryption filter (or key management agent) when certain policy rules are met. Otherwise, the key management server 212 denies the request and accordingly does not provide the requested key.

A key management agent (203 or 204) may comprise computer-readable program code for running an integrity check to collect host properties in a host (201 or 202), communicating with the key management server 212 for key delivery, setting up the encryption/decryption filter (207 or 208), and setting up the replication module (205 or 206).

In an example operation, upon start-up of the host 201, the key management agent 203 performs an integrity check and sends a key request along with the result the integrity check to the key management server 212 (see arrow 221). The requested key is needed by the host 201 to encrypt data written to or decrypt encrypted data read from the data storage 209. The host 201 cannot access the data storage 209 without the key. The key management agent 203 may also setup the replication module 205 and the encryption/decryption filter 207 at this time. The setup may involve initiating execution and configuring settings of the replication module 205 and encryption/decryption filter 207. For example, the key management agent 203 may setup the replication module 205 to receive disk access requests, forward or make disk access requests to the encryption/decryption filter 207, and communicate with the replication module 206 in the host 202 for real-time data replication. The key management agent 203 may also setup the encryption/decryption module 207 to receive a key from the key management server 212, receive disk access requests from the replication module 205, and access the data storage 209 using the key.

Assuming the key request made by the key management agent 203 meets the policy rules for receiving the key, the key management server 212 provides the key to the encryption/decryption filter 207 (see arrow 222). The encryption/decryption filter 207 receives the key and uses the key to encrypt data to be written to the data storage 209 or decrypt encrypted data read from the data storage 209. The corresponding components in the host 202 are brought up in a similar fashion upon startup of the host 202, with the key management agent 204 requesting its key from the key management server 212 (see arrow 223) and, assuming the key request meets the policy rules for receiving the key, the encryption/decryption filter 208 receiving the key from the key management server 212 (see arrow 224).

When writing the file 230 to the data storage 209, the replication module 205 receives the file 230 and forwards a copy of the file 230 to the host 202 over the computer network in real-time. In the host 202, the replication module 206 receives the file 230 and forwards the file 230 to the encryption/decryption module 208 along with a disk access request to write the file 230 in the data storage 210. The file 230 is in the raw, i.e., not encrypted, as transmitted from the host 201 and as received in the host 202. The encryption/decryption filter 208 encrypts the file 230 using a key it received from the key management server 212. It is to be noted that the encryption/decryption filters 207 and 208 use different keys. The encryption/decryption filter 208 stores the encrypted file 230 in the data storage 210.

In the host 201, the encryption/decryption module 207 receives the disk access request and the file 230 from the replication module 205, encrypts the file 230 using the key it received from the key management server 212, and stores the encrypted file 230 in the data storage 209. The encrypted file 230 and other encrypted data in the data storage 209 may be read and decrypted by the encryption/decryption module 207 for forwarding to the module that requested the read operation. Real-time data replication may similarly be performed from the host 202 to the host 201.

Because the hosts 201 and 202 are physically separate computer systems that use different keys for encryption/decryption, the real-time data replication system of FIG. 2 is especially advantageous when used with cloud computing systems, such as those provided by AMAZON EC2 or IBM SMART CLOUD networks. More particularly, an entity may lease a virtual machine in the cloud (e.g., host 201), secure data in the cloud, and have a secure back-up available in another computer system (e.g., host 202) without having to do perform relatively complex key management and data synchronization.

Figure 3:
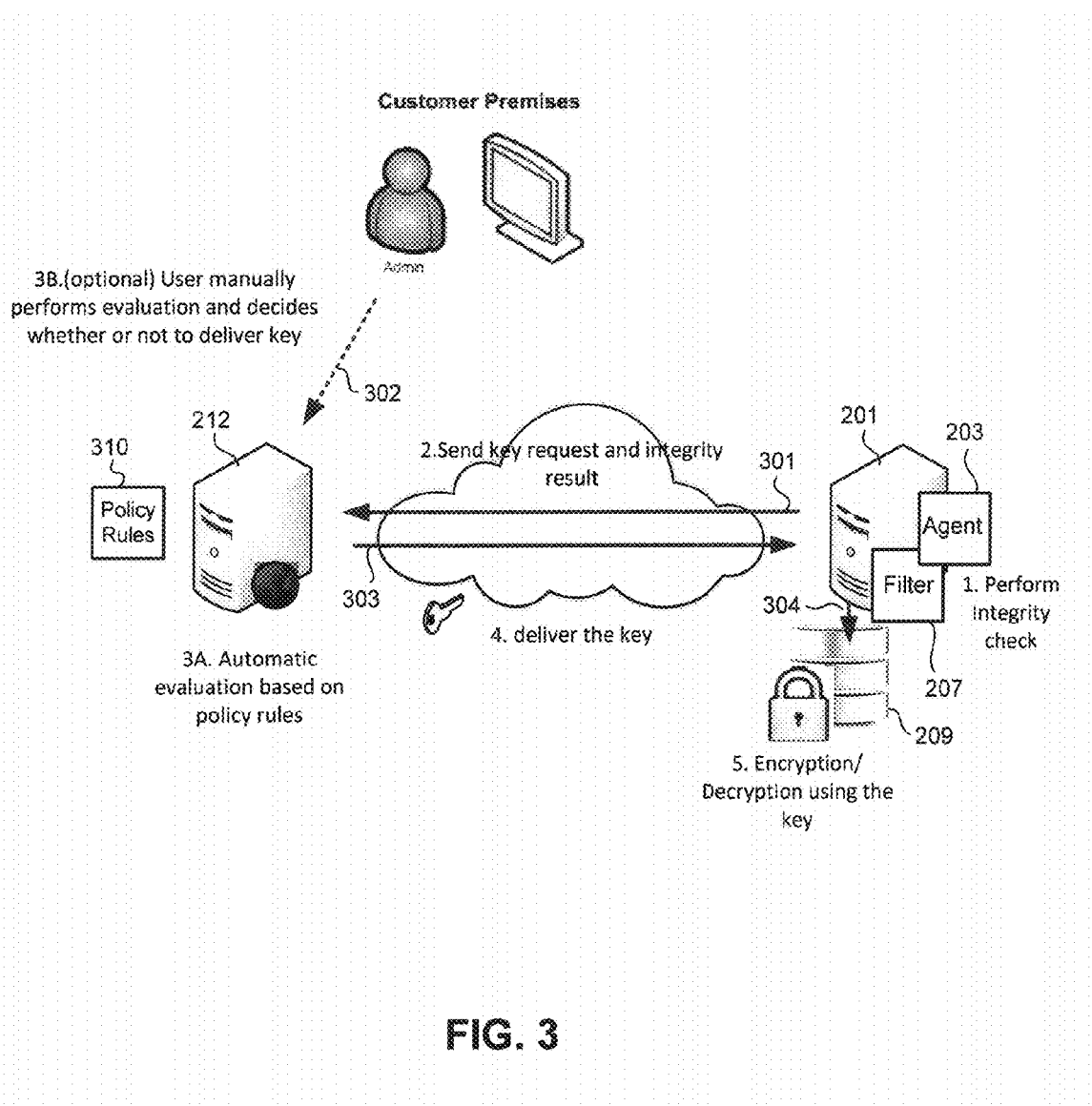
FIG. 3 shows a flow diagram of a method of delivering an encryption/decryption key to a host in accordance with an embodiment of the present invention.

FIG. 3 shows a flow diagram of a method of delivering an encryption/decryption key to a host in accordance with an embodiment of the present invention. The example of FIG. 3 shows the host 201 for illustration purposes. The host 202 may obtain its key from the key management server 212 in similar fashion.

In the example of FIG. 3, the key management agent 203 performs an integrity check prior to requesting the key from the key management server 212 (step 1). The integrity check may involve collecting properties of the host 201 that are checked against policy rules in the key management server 212. The properties collected by the key management agent 203 may include the version of one or more specified applications that are present in the host 201 (e.g., anti-virus software, OSSEC host-based intrusion detection system), operating system version and security patch, listening ports in the host (e.g., port 80, port 443), and other properties that affect the security of the host. The key management agent 203 sends a key request along with a result of the integrity check (e.g., properties of the host 201) to the key management server 212 (step 2; see arrow 301). The key request is sent over a computer network, such as over the Internet. The key management server 212 receives the key request and automatically (i.e., without human intervention) evaluates the key request, including the result of the integrity check and other information, to determine whether or not to grant the request (step 3A). In one embodiment, the key management server 212 includes policy rules 310 associated with each particular key. The key management server 212 retrieves the policy rules for the key requested by the host 201, and evaluates the key request based on whether or not the policy rules are met. Table 1 below shows example policy rules 310.

TABLE 1

| Rule | Description | Example |
| --- | --- | --- |
| Device Access Type | The requested access type, either read/write or read-only | read-only read/write |
| Device Mount Point | The mounting point for the data storage device if keys are approved | /mnt/secure X |
| Key Request Date | Date the key request was received | Apr. 13, 2012 |
| Request Source IP Address (IPv4) | IPv4 address the key request originates from | 192.168.0.0/16 192.168.1.1 |
| Request Source IP Address (IPv6) | IPv6 address the key request originates from | fe80:0000:0000:0000:-0202:b3ff:fe1e:8329 fe80:0000:0000:0000:-0202:b3ff:fe1e:8329/96 |
| Instance Location | The location of the server farm running the machine instance | Us-east (geographical location) |
| Specific Application Version | The version of one or more user specified applications that are presented in the machine instance | OSSEC version (A Host-based Intrusion Detection System) Anti-virus software version |
| Guest OS information | The operating system and architecture used by the machine image to run the Key Management Agent | Operating system version Architecture Security Patch |
| Network Services | Listening ports on the system running the Key Management Agent, both TCP and UDP ports are included | 80, 443 |

The policy rules 310 may comprise rules that need to be satisfied before a key request is granted. The key management server 212 may compare the policy rules 310 with information obtained by the key management server 212 from the integrity result (e.g., software versions), key request (e.g., whether the key will be used for read only, read/write, the mount point, authentication code), communication link (e.g., IP address, geographical location), internal resources (e.g., date of the request), and other sources of information. Using the Table 1 as an example, the policy rules 310 may require a particular anti-virus version in the host 201 before a key is provided. The key management server 212 compares the version of the anti-virus in the host 201 as indicated in the integrity result, and compares the version to the one required by the policy rules 310. The key management server 212 may go through all of the policy rules 310 to determine whether or not the host 201 meets all of them.

In some embodiments, a user (e.g., administrator) manually evaluates the key request and the result of the integrity check (optional step 3B). In that case, the user receives a notification from the key management server 212 of the key request, performs the evaluation himself, and instructs the key management server 212 to either grant or deny the request (see arrow 302).

When the key request is granted, either automatically by the key management server 212 or manually by the user, the key management server 212 provides the key to the host 201 (step 4; see arrow 303). Otherwise, the key management server 212 denies the request and withholds the key. In the host 201, when the key request is granted, the encryption/decryption filter 207 receives the key and uses the key to encrypt data to and decrypt data from the data storage 209 (step 5; arrow 304).

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
   a key management server providing a first key to a first host computer system and a second key to a second host computer system over a computer network;
   prior to providing the first key to the first host computer system, the key management server receiving a key request from the first host computer system, determining whether or not the first host computer system meets a policy rule for receiving the first key, and providing the first key to the first host computer system when the first host computer system meets the policy rule for receiving the first key;
   the first host computer system receiving a file to be written to a first data storage device in the first host computer system, providing a copy of the file to the second host computer system in real-time, encrypting the file using the first key to generate an encrypted file, and storing the encrypted file in the first data storage device; and
   the second host computer system receiving the copy of the file, encrypting the copy of the file using the second key to generate an encrypted copy of the file, and storing the encrypted copy of the file in a second data storage device in the second host computer system.

2. The computer-implemented method of claim 1, wherein the policy rule for receiving the first key includes a particular version of anti-virus software in the first host computer system.

3. The computer-implemented method of claim 1, further comprising:
   prior to providing the first key to the first host computer system, the key management server receiving the key request along with a result of an integrity check from the first host computer system, the result of the integrity check including properties collected in the first host computer system.

4. The computer-implemented method of claim 3 wherein the properties collected in the first host computer system include a version of an anti-virus software in the first host computer system.

5. The computer-implemented method of claim 1 wherein the first key is received by a first encryption/decryption filter in the first host computer system, and the first encryption/decryption filter uses the first key to encrypt the file to generate the encrypted file.

6. The computer-implemented method of claim 5 wherein the second key is received by a second encryption/decryption filter in the second host computer system, and the second encryption/decryption filter uses the second key to encrypt the copy of the file to generate the encrypted copy of the file.

7. A system for real-time data replication comprising:
   a key management server that provides a first key to a first host computer system and a second key to a second host computer system over a computer network;
   the first host computer system that receives a file to be written to a first data storage device in the first host computer system, provides a copy of the file to the second host computer system in real-time, encrypts the file using the first key to generate an encrypted file, and stores the encrypted file in the first data storage device; and the second host computer system that receives the copy of the file, encrypts the copy of the file using the second key to generate an encrypted copy of the file, and stores the encrypted copy of the file in a second data storage device in the second host computer system, wherein prior to providing the first key to the first host computer system, the key management server receives a key request from the first host computer system, determines whether or not the first host computer system meets a policy rule for receiving the first key, and provides the first key to the first host computer system when the first host computer system meets the policy rules for receiving the first key.

8. The system of claim 7 wherein the policy rule for receiving the first key includes a particular version of anti-virus software in the first host computer system.

9. The system of claim 8 wherein prior to providing the first key to the first host computer system, the key management server receives the key request along with a result of an integrity check from the first host computer system, the result of the integrity check including a property collected in the first host computer system.

10. The system of claim 9 wherein the property collected in the first host computer system includes a version of an anti-virus software in the first host computer system.

11. The system of claim 7 wherein the first key is received by a first encryption/decryption filter in the first host computer system, and the first encryption/decryption filter uses the first key to encrypt the file to generate the encrypted file.

12. The system of claim 11 wherein the second key is received by a second encryption/decryption filter in the second host computer system, and the second encryption/decryption filter uses the second key to encrypt the copy of the file to generate the encrypted copy of the file.

13. A computer-implemented method comprising:
prior to receiving a first key in a first host computer system, sending a key request from the first host computer system to a key management server, receiving the first key in the first host computer system from the key management server, comparing a property of the first host computer system to a policy rule, and providing the first key to the first host computer system when the property of the first host computer system meets the policy rule;
receiving the first key in the first host computer system over a computer network;
forwarding a copy of a file from the first host computer system to a second host computer system;
encrypting the file using the first key to generate an encrypted file;
storing the encrypted file in the first host computer system;
encrypting the copy of the file using a second key to generate an encrypted copy of the file in the second host computer system, the first key being different from the second key; and
storing the encrypted copy of the file in the second host computer system.

14. The computer-implemented method of claim 13 wherein the property of the first host computer system includes a version of an anti-virus in the first host computer system.

15. The computer-implemented method of claim 13 wherein the first host computer system receives the first key over the Internet.

16. The computer-implemented method of claim 13 further comprising:
prior to receiving the first key in the first host computer system, running an integrity check in the first host computer system, sending a key request and a result of the integrity check from the first host computer system to the key management server, and receiving the first key from the key management server.

* * * * *